United States Patent [19]
Beisch

[11] 3,868,147
[45] Feb. 25, 1975

[54] WHEEL TRIM
[75] Inventor: Hans R. Beisch, Amherstburg, Ontario, Canada
[73] Assignee: Norris Industries, Inc., Ypsilanti, Mich.
[22] Filed: Apr. 4, 1974
[21] Appl. No.: 457,814

[52] U.S. Cl. ............................ 301/37 C, 301/37 ST
[51] Int. Cl. ............................................. B60b 3/00
[58] Field of Search.......... 301/37 C, 37 CD, 37 ST, 301/37 T, 37 R

[56] References Cited
UNITED STATES PATENTS
3,322,468  5/1967  Spisak ............................. 301/37 R
3,389,937  6/1968  Brumfield ...................... 301/37 CD Primary Examiner—M. Henson Wood, Jr.
Assistant Examiner—D. W. Keen
Attorney, Agent, or Firm—Harness, Dickey & Pierce

[57] ABSTRACT

Wheel trim for the axially outer face of a vehicle wheel includes an annular retention band member to which a plurality of individual spring retention clips are secured. Each spring retention clip is disposed against the annular retention band member and has a pair of projecting tabs, each of which is held by means of a corresponding lanced and embossed tab on the retention band member to constrain the clip against radial and circumferential displacement.

20 Claims, 5 Drawing Figures

PATENTED FEB 25 1975
3,868,147
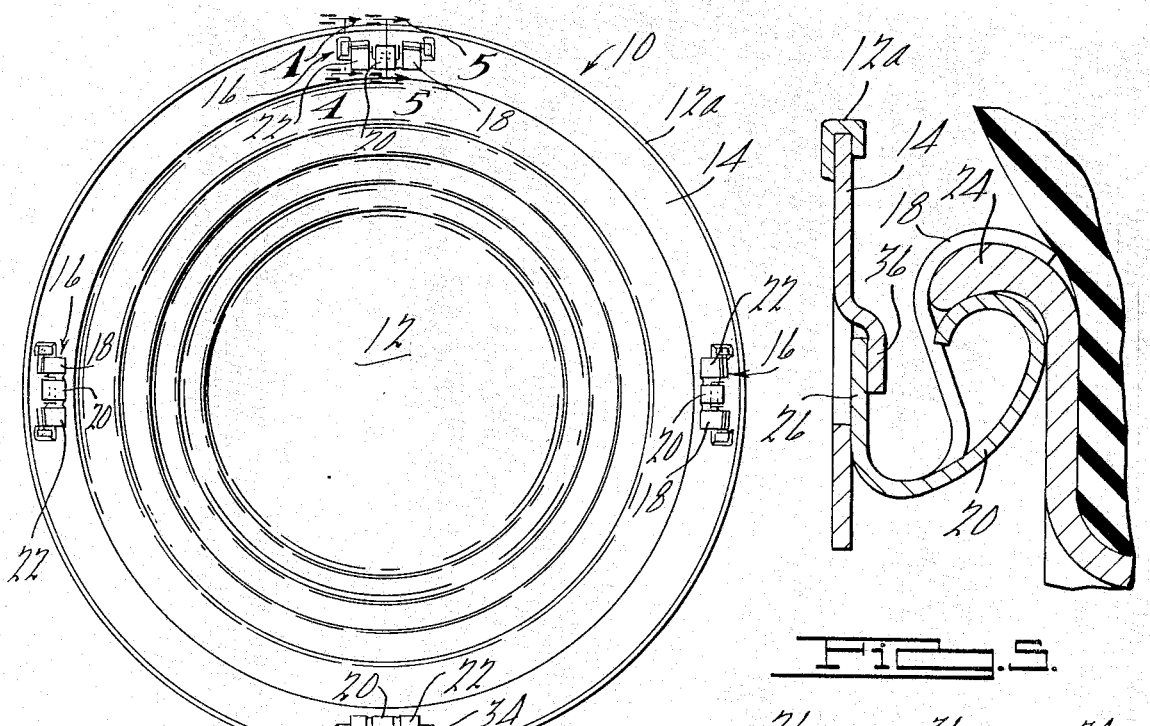
FIG.1.
FIG.2.
FIG.3.
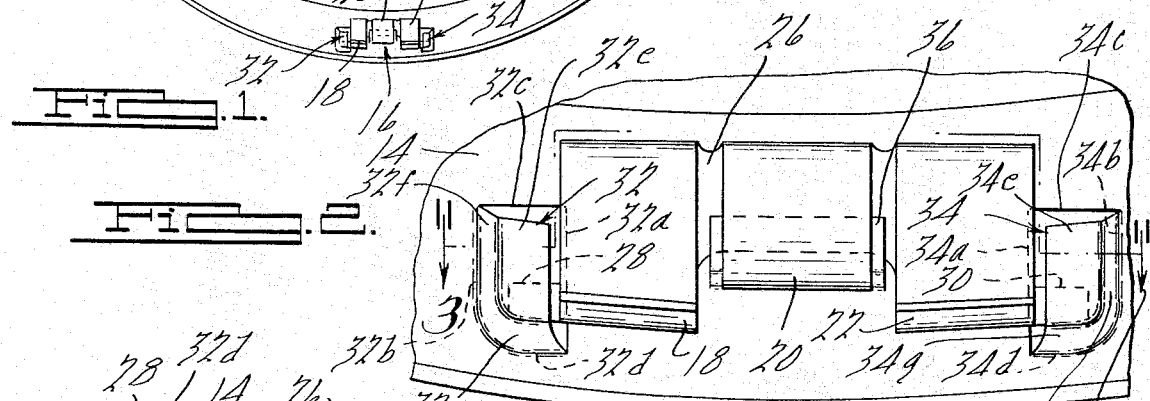
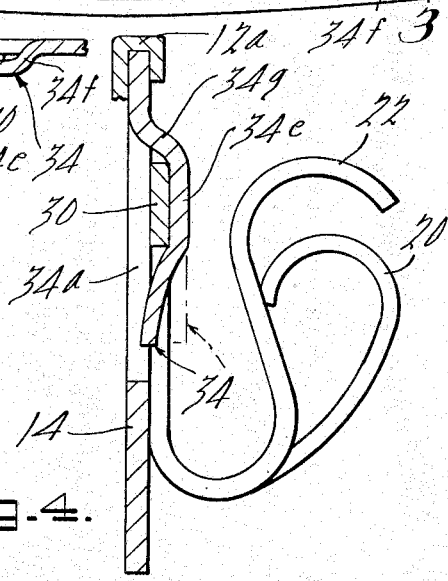
FIG.5.
FIG.4.

WHEEL TRIM

BACKGROUND AND SUMMARY OF THE INVENTION

The present invention pertains to vehicle wheel trim for disposition on the axially outer face of a vehicle wheel, and, in particular, to improvements in securing spring retention clips to a wheel trim retention band.

Wheel trim presently in use is often of multipiece construction. One multipiece construction includes annular retention band structure to which a decorative cover member is affixed, usually by wrapping the outer periphery of the cover member around the outer periphery of the retention band structure. A plurality of spring retention clips are secured at intervals to the retention band structure, and the clips grip the wheel to retain the wheel trim thereon.

In a preliminary novelty search conducted in connection with the present invention, the following U.S. patents were developed: U.S. Pat. Nos. 2,431,338; 2,898,153; 3,322,468; and 3,746,397. Although the principles of the present invention are potentially applicable to many spring retention clip designs, the present invention is especially well suited for spring retention clips of the type disclosed in U.S. Pat. No. 3,322,468 assigned to the same assignee as the present application; and in certain aspects the present invention represents an improvement upon the wheel trim disclosed in this patent.

Among the objects of the present invention are to provide improved wheel trim including novel retention band and clip structure which: requires only a single retention band member; securely holds the spring clips in desired positions on the retention band member without welding, soldering, or the like; requires no separate fasteners for fastening the spring retention clips to the retention band; is potentially applicable to a variety of specific spring clip constructions; reduces the weight of the wheel trim; minimizes the material and assembly costs; and exhibits good wheel retention characteristics.

Additional objects, features, and advantages of the invention, along with those enumerated above, will be seen in the ensuing description and claims which are to be taken in conjunction with the accompanying drawing.

BRIEF DESCRIPTION OF THE DRAWING

The drawing illustrates a preferred embodiment of wheel trim in accordance with the best mode presently contemplated for carrying out the invention.

FIG. 1 is a plan view of the axially inner face of vehicle wheel trim embodying principles of the present invention.

FIG. 2 is an enlarged fragmentary view of a portion of FIG. 1 illustrating greater detail.

FIG. 3 is a sectional view taken in the direction of arrows 3—3 in FIG. 2 and having a portion broken away.

FIG. 4 is an enlarged sectional view taken in the direction of arrows 4—4 in FIG. 1.

FIG. 5 is an enlarged sectional view taken in the direction of arrows 5—5 in FIG. 1 and illustrating the mounting of the wheel trim on a vehicle wheel.

DESCRIPTION OF THE PREFERRED EMBODIMENTS

In the drawing, vehicle wheel trim 10, in accordance with principles of the present invention, comprises: a decorative cover member 12; a single annular retention band member 14; and a plurality of spring retention clip members 16. Cover member 12 is illustratively disclosed as a full cover with the outer periphery thereof folded, as at 12a, around the outer periphery of retention band member 14 to secure the two in assembled relation. Alternatively, other types of cover member may be used with the present invention. Retention band 14 is a flat annular member which may be formed from a strip of metal using known techniques.

Although its principles are potentially applicable to various spring retention clip designs, the present invention is especially well suited for spring retention clips of the type shown in U.S. Pat. No. 3,322,468, as mentioned above, and the illustrated preferred embodiment contemplates the use of four such clips 16 disposed at 90° intervals around wheel trim 10, with each clip 16 having three circumferentially spaced, formed retention fingers 18, 20, and 22 via which the wheel trim removably mounts on the outer terminal flange 24 of a vehicle wheel rim (as shown in FIG. 5). Each spring retention clip 16 comprises a flat body 26 disposed against the axially inner surface of retention band member 14 with the three retention fingers 18, 20, and 22 formed at the radially inner portion of body 26 to project axially inwardly of retention band member 14 for engagement with wheel flange 24. As shown, the two outer fingers on each clip grip the outer surface of wheel flange 24, while the central finger 20 grips the inner surface of flange 24. As best seen in FIG. 2, a pair of circumferentially directed projecting tabs 28 and 30, respectively, project away from body 26 on circumferentially opposite sides thereof and lie in the same plane as body 26.

In accordance with principles of the present invention, each clip 16 is retained on retention band member 14 by a pair of lanced and embossed retention tabs 32, 34 formed in retention band member 14. Each retention tab 32, 34, respectively, is formed to grip the corresponding projecting tab 28, 30, respectively, such that the spring retention clip 16 is held against retention band member 14 and substantially immovably constrained against both radial and circumferential movement thereon.

Initially, retention band member 14 is imperforate at the location of each retention tab. Each retention tab 32, 34 is formed from retention band member 14 by what may be considered a two-step process. In the first step, the retention tabs are formed to a preliminary shape to permit the spring retention clips to be preliminarily assembled to the retention band (this preliminary shape being shown in broken lines in FIG. 4). In the second step, the retention tabs are formed to a final shape to secure the clips on the retention band member (this final shape being shown in solid lines in FIG. 4). Each retention tab is integrally connected to a portion of the edge of the opening left in retention band member 14 after the retention tab is formed therefrom. As illustrated in the drawing, the residual opening is of generally rectangular shape being defined by a pair of circumferentially spaced, generally radial edges and a pair of radially spaced, generally circumferential edges. The radial edges of the opening left by retention tab 32 are designated 32a and 32b, and the circumferential edges 32c and 32d; the radial edges of the opening left by tab 34 are designated 34a and 34b, and the circumferential edges 34c and 34d. In its preliminary shape, each retention tab is displaced axially inwardly of retention band member 14 to comprise an overlying generally rectangular portion disposed parallel to retention band member 14 and integrally connected by means of formed connecting sections to both the circumferentially outer edge of its opening (relative to the clip) and to the radially outer edge of its opening. In the drawing, the overlying rectangular portion of retention tab 32 is designated 32e and is connected to the outer radial edge 32b by a connecting section 32f and to the outer circumferential edge 32d by a connecting section 32g. The overlying portion of tab 32 is designated 34e and is connected to the outer radial edge 34b by means of a connecting section 34f and to the outer circumferential edge 34d by a connecting section 34g. The retention tabs are formed from retention band member 14 by lancing the retention band member along the inner circumferential and radial edges of each opening (that is, along edges 32a, 32c and edges 34a, 34c). The retention tabs are next formed to their preliminary shape by embossing. The preliminary shape of each retention tab defines, between retention band member 14 and the overlying portion of the retention tab, a radially inwardly facing opening generally coextensive with the radially inner circumferential edge of the opening and a circumferentially facing opening generally coextensive with the circumferentially inner radial edge of the opening. The axial dimension of these openings is barely slightly greater than the thickness of projecting tabs 28 and 30 to permit preliminary assembly of each clip 16 to retention band member 14 by first positioning the clip body 26 against the inner surface of the retention band member with the projecting tabs 28 and 30 disposed radially inwardly of, and circumferentially aligned with, edges 32c, 34c and thereafter sliding the clip radially outwardly to lodge the projecting tabs 28 and 30 between the retention tabs and the residual openings in the retention band member. The circumferential dimension between connecting sections 32f and 34f just exceeds the circumferential dimension of the clip as measured across the clip between the free ends of projecting tabs 28 and 30 to thereby permit lodging of the projecting tabs 28 and 30 to positions where the radially outer edges thereof abut the radially outer connecting sections 32g, 34g. Assembly is completed by deforming the overlying portion of each retention tab around the radially inner edge of the corresponding projecting tab as shown in solid lines in FIG. 5. The clip is now held securely in its intended position to substantially immovably constrain the clip against both radial and circumferential displacement on the retention band member.

In order to minimize any tendency of the projecting tabs to twist within their retention tabs when the wheel trim is applied to a wheel, it is preferable to also form in retention band member 14 a central radially inwardly directed tab 36 which wraps around the radially outer edge of, and overlies, the central portion of clip body 26. Tab 36 may be formed in the same manner as tabs 32 and 34 by lancing and embossing and may be formed concurrently with the formation of the retention tabs to their preliminary shape. Tab 36 defines a radially inwardly facing opening having an axial dimension barely slightly greater than the thickness of the material from which clip 16 is formed so that body 26 may be slid beneath tab 36 as the clip is preliminarily assembled to the retention band member.

It will be noted that the above-described assembly of the spring retention clips to the retention band does not require the use of welding, riveting, or like processes, nor are separate fasteners required for securing the clips to the retention band. Hence, with the present invention, material and assembly costs are reduced while the finished retention band and clip assembly exhibits good retention characteristics for removably retaining the wheel trim on a wheel.

As an alternate method, it is contemplated that only one of the retention tabs need be preliminarily formed with both circumferentially and radially inwardly facing openings between the overlying retention tab portion and the retention band member, the other retention tab being formed to provide only a circumferentially inwardly facing opening. In order to assemble a clip to a retention band member so constructed, the clip is inclined at an angle and oriented so that one of its projecting tabs can be inserted beneath the retention tab which is formed to provide only the circumferentially facing opening. As this projecting tab is inserted through this circumferentially facing opening and beneath the overlying portion of the retention tab, the clip is swung bodily to bring its other projecting tab through the radially inwardly facing opening formed by the other retention tab and beneath the overlying retention tab portion. This latter retention tab is deformed to secure the clip on the retention band member, the other projecting tab being already secured by the initially formed shape of the other retention tab. The clip is held on the retention band member in the same manner as described above.

While it will be apparent that the preferred embodiments of the invention disclosed are well calculated to fulfill the objects above stated, it will be appreciated that the invention is susceptible to modification, variation, and change without departing from the spirit thereof.

What is claimed is:

1. In a wheel trim assembly for disposition on the axially outer face of a vehicle wheel having a wheel flange, said wheel trim assembly being of the type comprising an annular retention band member disposed substantially in a plane perpendicular to the axis of the wheel trim assembly and a spring retention clip member disposed against and secured to said retention band member and engageable with the wheel flange for mounting the wheel trim assembly on the wheel, an improved means for securing said spring retention clip member to said retention band member comprising: means defining a pair of spaced openings in one of said members; a pair of tab sections on the other of said members, each of said tab sections being disposed at a corresponding one of said openings and each of said tab sections being defined at least in part by a pair of edges lying inside the edge of the corresponding opening; and a tab section securing means on said one member at each said opening therein, each said tab section securing means extending from a portion of the edge of its opening over one of said edges of the corresponding tab section, across the corresponding tab section, and over the other edge of the corresponding tab section.

2. The improved means as claimed in claim 1 wherein said tab sections are disposed on said spring retention clip member and said openings and said tab section securing means are disposed on said retention band member.

3. The improved means as claimed in claim 2 wherein said spring retention clip member comprises a body disposed against said retention band member and said tab sections are directed away from said body in opposite circumferential directions.

4. The improved means as claimed in claim 3 wherein said body is disposed circumferentially between said tab sections.

5. The improved means as claimed in claim 4 wherein said retention band member further includes means defining an additional opening therein and a clip body securing means extending from a portion of the edge of said additional opening and holding said clip body against said retention band member.

6. The improved means as claimed in claim 1 wherein said tab sections and said tab section securing means are disposed to constrain said spring retention clip member against radial displacement.

7. The improved means as claimed in claim 6 wherein said tab section securing means include means for also constraining said spring retention clip member against circumferential displacement.

8. The improved means as claimed in claim 1 wherein each said tab section and the corresponding opening are disposed on opposite sides of a common plane.

9. The improved means as claimed in claim 1 wherein each said tab section securing means constrains the corresponding tab section against displacement in a direction between said edges of the corresponding tab section and further includes means for constraining the corresponding tab section against displacement in a different direction.

10. The improved means as claimed in claim 1 wherein each said tab section includes a third edge extending between said pair of edges thereof and each said tab section securing means includes means extending over said third edge of the corresponding tab section.

11. The improved means as claimed in claim 1 wherein the portion of the edge of each said opening from which each tab section securing means extends is a generally circumferentially extending edge.

12. The improved means as claimed in claim 11 wherein each said generally circumferentially extending edge is disposed at the radially outer edge of its opening.

13. The improved means as claimed in claim 11 wherein each said opening includes a radially extending edge adjacent its circumferentially extending edge and each said tab section securing means also connects to the corresponding radially extending edge.

14. The improved means as claimed in claim 1 wherein the portion of each said tab section securing means which extends across the corresponding tab section is disposed in axially spaced relation to the corresponding opening.

15. The improved means as claimed in claim 14 wherein the portion of each said tab section securing means which extends over said other edge of the corresponding tab section is disposed to axially overlap said other edge.

16. The improved means as claimed in claim 1 wherein the portion of each said tab section securing means which extends across the corresponding tab section is disposed to bear against the corresponding tab section.

17. The improved means as claimed in claim 1 wherein said tab sections are disposed on said spring retention clip member at opposite circumferential edges thereof to project in opposite circumferential directions away from each other and to each terminate in a free edge, each said free edge being located in axial cross section within the edge of the corresponding opening, each said opening being defined in part by a radially outer, generally circumferential edge and a generally radial edge, each said tab section securing means extending radially inwardly from the radially outer, generally circumferential edge of its opening to radially constrain the corresponding tab section, each said tab section securing means further including means extending over the free edge of the corresponding tab section and connecting with the generally radial edge of its opening.

18. In a method of making wheel trim of the type comprising an annular retention band member and a plurality of spring clips secured at intervals to the retention band member, each said spring retention clip including a body disposed against the retention band member and a pair of spaced projecting tabs projecting from the body, an improved method for securing each spring retention clip to the retention band member comprising: forming in said retention band member a pair of spaced retention tabs which are spaced a distance approximately equal to the distance between the projecting tabs on the spring retention clip; each said retention tab being formed to define an overlying retention tab portion displaced from the residual opening left in the retention band member by the formation of the retention tab and means connecting a portion of the periphery of the overlying portion with a portion of the edge of the residual opening such that the projecting tabs of the spring retention clip can be lodged beneath the overlying portions of the respective retention tabs; preliminarily assembling the spring retention clip to the retention band member by disposing the clip body against the retention band member and bodily moving the clip to lodge the projecting tabs thereof beneath the respective overlying portions of the respective retention tabs; and deforming each retention tab to prevent the projecting tabs from being dislodged therefrom.

19. The improved method as claimed in claim 18 wherein both projecting tabs are substantially simultaneously lodged beneath the corresponding overlying portions of the respective retention tabs.

20. A wheel trim assembly for disposition on the axially outer face of a vehicle wheel having a wheel flange, said wheel trim assembly comprising: an annular retention band member; a spring retention clip member disposed on said retention band member and engageable with the wheel flange for mounting the wheel trim assembly on the wheel; and means for securing said spring retention clip member to said retention band member comprising a pair of spaced retention tabs on one of said members and a pair of projecting tabs on the other of said members, each of said retention tabs extending away from said one member across one of said projecting tabs and back toward said one member to rigidly affix said two members together.

* * * * *